Figure 1:
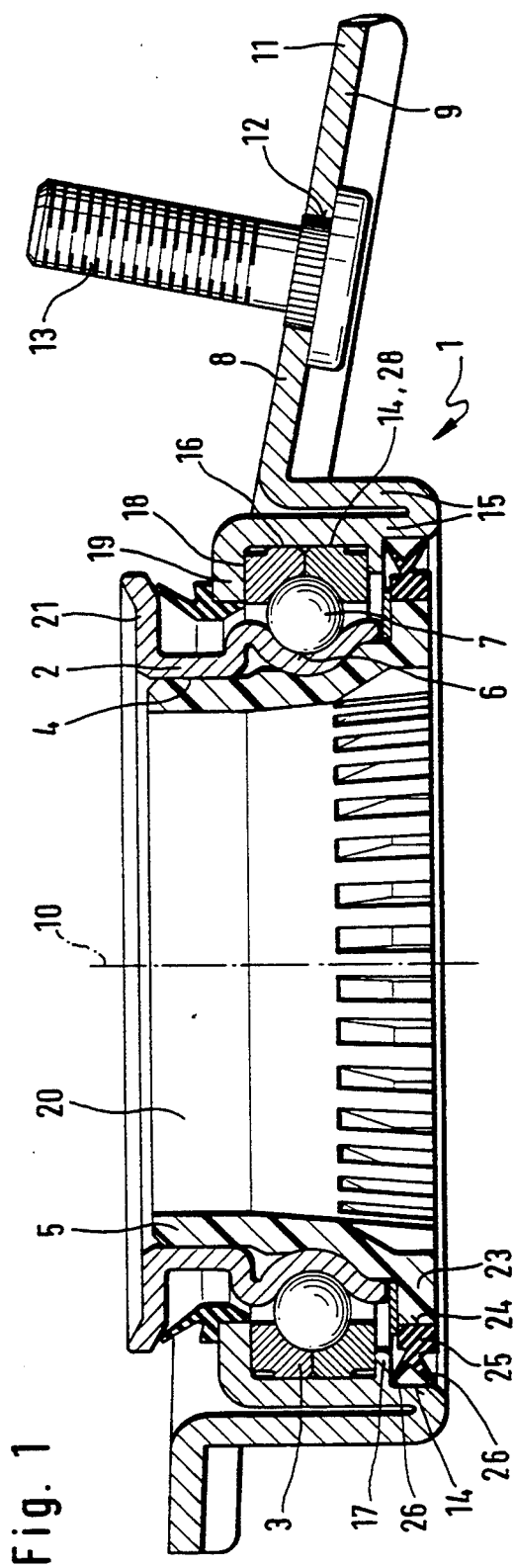

United States Patent [19]

Zernickel et al.

[11] Patent Number: 5,439,298
[45] Date of Patent: Aug. 8, 1995

[54] SUSPENSION STRUT BEARING

[75] Inventors: Alexander Zernickel; Horst Doppling, both of Herzogenaurach; Horst Scholian, Aurachtal, all of Germany

[73] Assignee: Ina Walzlager Schaeffler KG, Germany

[21] Appl. No.: 162,037
[22] PCT Filed: Aug. 27, 1992
[86] PCT No.: PCT/EP92/01979
  § 371 Date: Dec. 2, 1993
  § 102(e) Date: Dec. 2, 1993
[87] PCT Pub. No.: WO93/04882
  PCT Pub. Date: Mar. 18, 1993

[30] Foreign Application Priority Data
  Sep. 5, 1991 [DE] Germany ............... 41 29 513.7

[51] Int. Cl.⁶ .................................. F16C 43/00
[52] U.S. Cl. ........................... 384/537; 384/499
[58] Field of Search ........... 384/499, 513, 537, 543, 384/544, 584, 585, 607, 609, 615, 617, 536, 485; 280/668

[56] References Cited

U.S. PATENT DOCUMENTS 3,051,469  8/1962  Boschi .
4,462,608  7/1984  Lederman .................. 280/668
4,566,812  1/1986  Takei et al. ................. 384/607 X
4,640,632  2/1987  Brandenstein et al. ........... 384/537
4,909,642  3/1990  Hoermandinger ................ 384/536

FOREIGN PATENT DOCUMENTS 0342725  11/1989  European Pat. Off. .
0390331  10/1990  European Pat. Off. .
2225647  11/1974  France .
7208788   5/1972  Germany .
2820585  11/1979  Germany .
3619942  12/1987  Germany .

Primary Examiner—Thomas R. Hannon
Attorney, Agent, or Firm—Bierman and Muserlian

[57] ABSTRACT

A bearing (1) for the wheel suspension strut of a motor vehicle has an inner and an outer bearing ring (2, 3). The inner bearing ring (2) radially encloses a clearance ring (5) concentrically arranged in its bore (4). A bearing housing (8) made of deep-drawn sheet metal encloses the outer bearing ring (3). In order to reduce the total mass of the bearing and to allow it to be easily linked to a neighboring part of the car body, the bearing housing (8) forms a single piece with a flange (9) that extends essentially transversely to the bearing axis (10). The flange has at least one bore and screw (12, 13) for securing the suspension strut bearing (1) to a neighboring part of the car body.

4 Claims, 1 Drawing Sheet

U.S. Patent    Aug. 8, 1995    5,439,298

SUSPENSION STRUT BEARING

The invention concerns a suspension strut bearing for the suspension of wheels in automotive vehicles comprising an inner bearing ring and an outer bearing ring which can be secured by means to a neighboring part of a vehicle body, the inner bearing ring radially surrounding a tolerance ring arranged concentrically in a bore thereof, the said bearing further comprising a bearing housing of deep drawn sheet metal which encloses the outer bearing ring, and a flange which extends essentially crosswise to a bearing axis and is made in one piece with the bearing housing.

A suspension strut bearing with a thin-walled one-piece housing is described in DE-A 28 20 585. In this document considered to be species defining, the outer bearing ring is surrounded in the peripheral direction by a bush-like portion of the housing. This portion merges in the axial direction into a radially extending flange for securing the prior art suspension strut bearing to a neighboring part of a vehicle body. A disadvantage of this bearing is that considerable sheet thicknesses are required for obtaining a positionaly exact securing of the bearing to a neighboring part of a vehicle body. Sheet thicknesses of 5 mm which are commonly used in this region of a vehicle body are not deep drawable with the required precision, or are so only at very high costs. A possible danger is that the housing undergoes undesired deformation on application of force. Moreover, the prior art document does not indicate any measures for connecting the outer bearing ring in an adequately strong manner to the bush-like flange of the housing, and particularly for fixing the outer bearing ring in the axial direction. In addition, no measures for an adequate sealing of the bearing can be inferred from the document.

Other solutions show a two-piece flange, for example with complicated reinforcement inserts, or welded constructions with the known disadvantages, or again, structures with a relatively solid design of the bush-like portion (DE-A 39 42 652).

It is therefore the object of the invention to provide a suspension strut bearing of the initially described type in which the aforementioned disadvantages are eliminated and which particularly comprises a simple-to-manufacture means for connection to a neighboring part of a vehicle body which meets high requirements of both strength and precision.

The invention achieves this object according to the characterizing part of claim 1 by the fact that the bearing housing comprises a crimping of 180° in at least one region of its inner surface which bears against the outer bearing ring, the crimping extends at least over the entire outer surface of the outer bearing ring or over the front end thereof, an axial positional fixing of the outer bearing ring is assured by an annular swaging of the inner surface of the bearing housing, and the crimping merges directly into the flange. This flange has a sheet thickness suitable for deep drawing and can be stiffened by beads. By the choice of this sheet thickness, it is possible to make the flange and the bearing housing in one piece from a sheet metal part. The hitherto used welded joint involving detrimental microstructural changes in the edge regions of the welded joint is no longer required. The total mass of the suspension strut bearing is reduced by the construction of the invention.

Advantageous developments in the invention form the subject matter of the sub-claims 2 to 4 and will be described more closely below.

Figure 2:
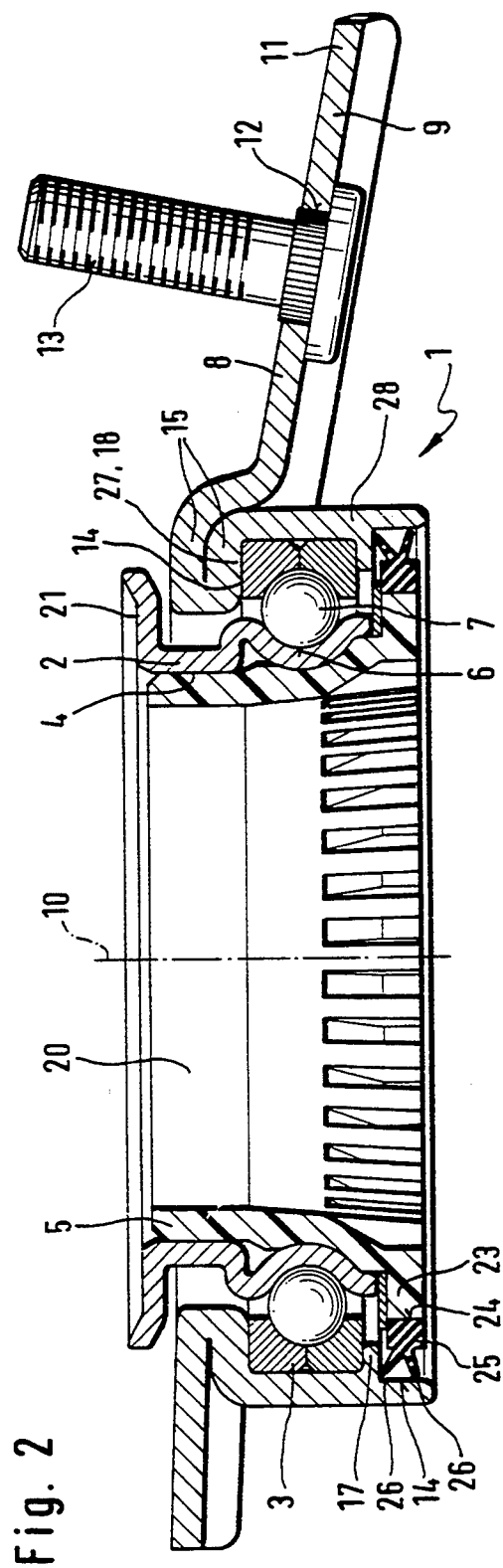

From claim 2 it can be seen that the bearing housing is angled radially inwards starting from a cylindrical portion thereof which radially surrounds the outer bearing ring, and this angled portion merges into a radially outwards crimped portion to form the flange (FIG. 2). The crimpings described here and in claim 1 serve on the one hand to positionaly fix the outer bearing ring in the suspension strut bearing and on the other hand they serve for the stiffening of the entire construction.

In a further development of the invention according to claim 3, an inner bearing ring for the suspension strut bearing is made of a deep drawable material, preferably steel sheet, and a radially extending end surface of this inner bearing ring projecting axially out of the bore of the suspension strut bearing simultaneously forms a support and a stop for a damping element extending through the bore of the suspension strut bearing. This likewise one-piece sheet metal embodiment makes the complicated multipiece constructions mainly used in the prior art superfluous. The mass of the suspension strut bearing of the invention is thus further reduced and its manufacturing costs are minimized.

The tolerance ring described in claim 4 serves to assure an exactly fitted reception of the damping element situated in its bore and is advantageously made of a plastics material, particularly of a glass fibre reinforced polyamide, but other materials such as flexible and/or lightweight materials can also be used. The radial sealing ring which bears against a flange of the tolerance ring can be made of polyurethane.

Two examples of embodiment of the invention are represented in the drawings and will be described more closely below.

FIG. 1 is an axial section of a suspension strut bearing with a crimping of the bearing housing in the region of the radial outer surface of the outer ring, and FIG. 2 is an axial section corresponding to FIG. 1 with a crimping in the region of an axial outer surface.

FIG. 1 shows a suspension strut bearing 1 of the invention comprising an inner bearing ring 2 and an outer bearing ring 3. The outer bearing ring 3 is made in two parts. The inner bearing ring 2 is made of steel sheet and surrounds a tolerance ring 5 arranged concentrically in its bore 4, the raceway 6 of the inner bearing ring 2 being roller-burnished to receive the balls 7. A bearing housing 8 of a deep drawable material encloses the outer bearing ring 3. The bearing housing 8 at the same time forms a flange 9 which extends substantially crosswise to a bearing axis 10. At least one bore 12 for a screw 13 for securing the suspension strut bearing 1 to a neighboring part of a vehicle body is provided in the radial outer region 11 of the flange 9 facing away from the bearing axis 10.

The inner surface 14 of the bearing housing 8 which bears against the outer bearing ring 3 is reinforced by a crimping 15, in this case of 180°. This crimping 15 extends substantially over the radial outer surface 16 of the outer bearing ring 3.

The outer bearing ring 3 is axially fixed by a swaging 17 of the inner surface 14 of the bearing housing 8, and the other front end 18 of the outer bearing ring 3 facing away from the swaging 17 bears against a radially inwards angled end region 19 of the inner surface 14 of the bearing housing 8. The bearing ring 3 can be made by stamping from a welded blank. Advantageously, the swaging 17 in the bearing housing 8 is made as an annular swaging in the axial direction. The inner bearing ring 2 of the suspension strut bearing 1 projects axially out of the bore 20 thereof and the projecting end surface 21 of the inner bearing ring 2 forms a support and a stop for a damping element extending through the bore 20 of the suspension strut bearing 1. Since such a damping element is sufficiently known, it will not be described more closely here.

The tolerance ring 5 made of a plastics material is mounted in the bore 4 of the inner bearing ring 2 and comprises a radial flange 23 on whose outer surface 24 a radial sealing ring 25, advantageously comprising two sealing lips 26, is fixed. These sealing lips 26 bear against a part of the inner surface 14 of the bearing housing 8 and seal the suspension strut bearing 1 permanently against leaking lubricant.

FIG. 2 shows another embodiment of the crimping 15 of the bearing housing 8. In this case, the crimping 15 forms an axial contact surface 27 for the outer bearing ring 3. A swaging 17 of the inner surface 14 of the bearing housing 8 is provided in this embodiment as well.

We claim:

1. A suspension strut bearing (1) for the suspension of wheels in automotive vehicles comprising an inner bearing ring (2) and an outer bearing ring (3) which can be secured by means (12, 13) to a neighboring part of a vehicle body, the inner bearing ring (2) radially surrounding a tolerance ring (5) arranged concentrically in a bore (4) thereof, the said bearing further comprising a bearing housing (8) of deep drawn sheet metal which encloses the outer bearing ring (3), and a flange (9) which extends essentially crosswise to a bearing axis (10) and is made in one piece with the bearing housing (8), characterized in that the bearing housing (8) comprises a crimping (15) of 180° C. in at least one region of its inner surface (14) which bears against the outer bearing ring (3), the crimping (15) extends at least over the entire outer surface (16) of the outer bearing ring (3) or over the front end (18) thereof, an axial positional fixing of the outer bearing ring (3) is assured by an annular swaging (17) of the inner surface (14) of the bearing housing (8), and the crimping (15) merges directly into the flange (9).

2. A suspension strut bearing of claim 1 wherein the bearing housing (8) is angled radially inward starting from a cylindrical portion (28) thereof which radially surrounds the outer bearing ring (3), and this angled portion merges into a radially outward crimped portion to form the flange (9).

3. A suspension strut bearing of claim 1 wherein an inner bearing ring (2) for the suspension strut bearing (1) is made of a deep drawable material and a radially extending end surface (21) of this inner bearing ring (2) projecting axially out of the bore (20) of the suspension strut bearing simultaneously forms a support and a stop for a damping element extending through the bore (20) of the suspension strut bearing (1).

4. A suspension strut bearing of claim 1 wherein the tolerance ring (5) comprises a radial flange (23) serving to receive a radial sealing ring (25) comprising two sealing lips (26) which bear against the inner surface (14) of the bearing housing (8).

* * * * *